(12) United States Patent
Kubis et al.

(10) Patent No.: US 8,622,573 B2
(45) Date of Patent: Jan. 7, 2014

(54) LED ARRAY BEAM CONTROL LUMINAIRES

(75) Inventors: Frantisek Kubis, Postredni Becva (CZ); Pavel Jurik, Postredni Becva (CZ)

(73) Assignee: ROBE Lighting s.r.o., Postredni Becva (CZ)

( * ) Notice: Subject to any disclaimer, the term of this patent is extended or adjusted under 35 U.S.C. 154(b) by 629 days.

(21) Appl. No.: 12/582,261

(22) Filed: Oct. 20, 2009

(65) Prior Publication Data
US 2010/0103663 A1    Apr. 29, 2010

(51) Int. Cl.
*F21V 7/00* (2006.01)

(52) U.S. Cl.
USPC .. 362/231; 362/249.02; 362/235; 362/217.03

(58) Field of Classification Search
USPC ............ 362/800, 249.02, 249.1, 249.11, 362/217.03, 217.04, 235, 237, 279
See application file for complete search history.

(56) References Cited

U.S. PATENT DOCUMENTS

| | | | | |
|---|---|---|---|---|
| 4,345,308 | A * | 8/1982 | Mouyard et al. | 362/332 |
| 4,896,656 | A * | 1/1990 | Johnson | 126/92 B |
| 6,964,489 | B2 * | 11/2005 | Blume et al. | 362/27 |
| 7,517,113 | B2 * | 4/2009 | Bruckner | 362/290 |
| 8,057,072 | B2 * | 11/2011 | Takenaka et al. | 362/311.02 |
| 2003/0137828 | A1 * | 7/2003 | Ter-Hovhannisian | 362/92 |
| 2011/0116262 | A1 * | 5/2011 | Marson | 362/235 |

* cited by examiner

*Primary Examiner* — Anabel Ton

(57) ABSTRACT

The present invention provides LED array systems with which provides for a LED array luminair with reduced color fringing, light spill reduction and beam angle control and LED protection.

33 Claims, 13 Drawing Sheets

LED ARRAY BEAM CONTROL LUMINAIRES

RELATED APPLICATION(S)

This application is a utility filing claiming priority of utility application Ser. No. 12/402,412 filed on Mar. 11, 2009 claiming priority provisional application 61/068,924 filed 11 Mar. 2008 and provisional application: 61/106,967 filed on 20 Oct. 2008.

TECHNICAL FIELD OF THE INVENTION

The present invention generally relates to a system and method for driving LED arrays when used in a light beam producing luminaire. More particularly the invention relates to a system and method for driving an array of such Luminaires to generate images or light patterns. The invention also relates to preventing spill light and controlling the beam angle of an LED array. Additionally, the invention relates to a system and method for maximizing the light output from the LEDs while maintaining them at or below their optimum operating temperature and uniformity across the LED array or a plurality of LED arrays.

BACKGROUND OF THE INVENTION

High power LEDs are commonly used in luminaires for example in the architectural lighting industry—in stores, in offices and businesses; as well as in the entertainment industry—in theatres, television studios, concerts, theme parks, night clubs and other venues. In such applications LED arrays are frequently used to present images to an audience. It is common when projecting large images for the images to be divided into parts and then the parts transmitted to portions of the array. The transmission of these images can require significant bandwidth. In such applications the LED arrays are also frequently used to project a beam of light.

In these applications it is a common requirement to obtain the maximum light possible out of the LEDs without exceeding their operating temperature. LEDs are highly temperature sensitive and running them at too high a temperature will both reduce their output and shorten their life. In such applications, it is also frequently desirable to have the appearance of the image, light beam or plurality of light beams from a plurality of LED arrays be of consistent luminosity.

It is well known in the art to include a temperature sensor in an LED system to measure the temperature of the LEDs and use that information to control the operating current and voltage so that the LED always operates within safe operating parameters. However, the critical temperature is that of the LED semiconductor die itself and such temperature probes are often situated to measure the LED package or the heat sink rather than directly measuring the temperature of the die. To compensate for this many manufacturers include a safety band or dead space in the operating parameters to ensure that the temperature never rises too high. This safety band means that the LEDs are never achieving maximum possible brightness.

It is also known to consider the total power and heat dissipation of a bank of LEDs rather than that for each individual LED. If, for example, the luminaire has Red, Green and Blue LEDs mounted on a single circuit board or heat sink then if only the Red LEDs are illuminated it is possible to run those Red LEDs at a higher power than if all three groups, Red, Green and Blue were illuminated simultaneously.

These LED array fixtures are also used to project color light beams. For color control it is common to use an array of LEDs of different colors. For example a common configuration is to use a mix of Red, Green and Blue LEDs. This configuration allows the user to create the color they desire by mixing appropriate levels of the three colors. For example illuminating the Red and Green LEDs while leaving the Blue extinguished will result in an output that appears Yellow. Similarly Red and Blue will result in Magenta and Blue and Green will result in Cyan. By judicious control of the LED controls by color the user may achieve any color they desire within the color gamut defined by the LED colors employed in the array. More than three colors may also be used. For example it is well known to add an Amber or White LED to the Red, Green and Blue to enhance the color mixing and improve the gamut of colors available.

The differently colored LEDs may be arranged in an array in the luminaire where there is physical separation between each LED, and this separation, coupled with differences in die size and placement for each color, may affect the spread of the individual colors and results in objectionable spill light and color fringing of the combined mixed color output beam. It is common to use a lens or other optical device in front of each LED to control the beam shape and angle of the output beam; however these optical devices are commonly permanently attached to the luminaire requiring tools and skilled labor to change and may additionally need to be individually changed for each LED or pixel individually. It would be advantageous to be able to simply and rapidly change such optical devices for the entire array simultaneously without the use of tools.

There is a need for an inexpensive LED driving system which can maximize the output of connected LEDs in a luminaire while making the luminosity consistent across an array of LED array luminaires. There is also a need for a system and method that allows for the display of images or light patterns across an array of luminairs the display of which is controlled with conventional relatively low bandwidth control protocol.

There is also a need for a beam control system for an LED array luminaire which can be quickly and easily changed and provide improvements in spill light reduction and beam angle control.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the FIGUREs, like numerals being used to refer to like and corresponding parts of the various drawings.

The present disclosure generally relates to a method for driving LEDs when used in a light beam producing luminaire, specifically to a method relating to maximizing the light output from the LEDs while maintaining them at or below their optimum operating temperature. In one embodiment the present disclosure utilizes a temperature sensor within an LED array and a predictive algorithm to maximize LED output.

Figure 1:
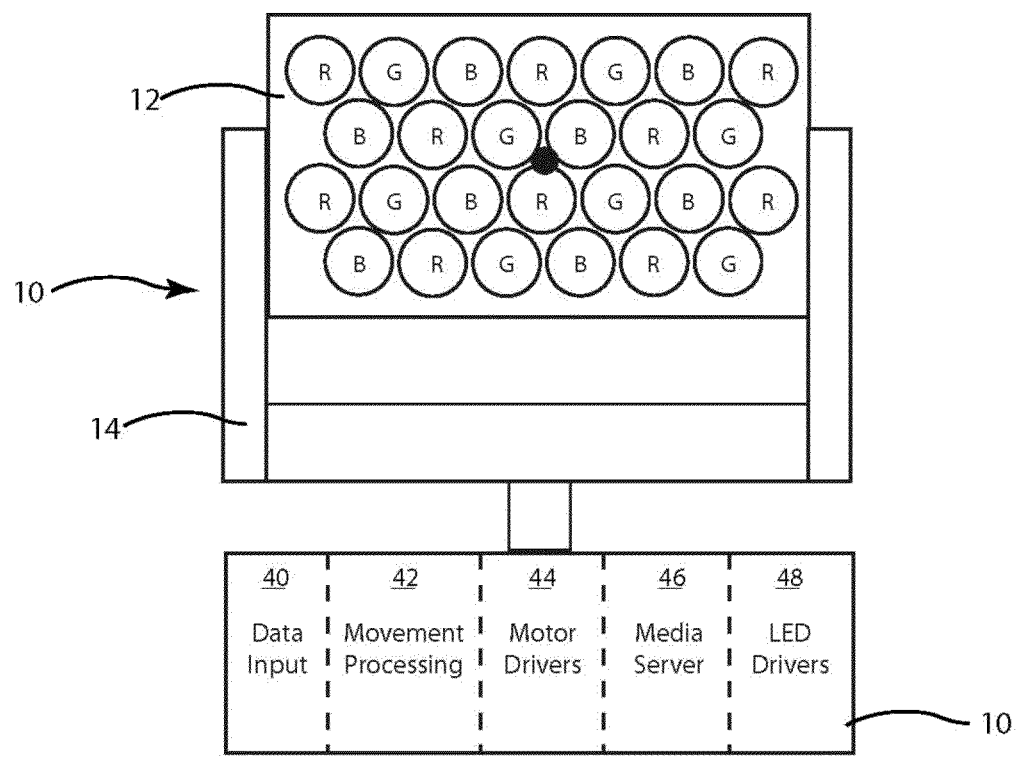
FIG. 1 illustrates an LED array multi-parameter automated luminaire.

FIG. 1 illustrates an embodiment of an automated luminaire 10 with an LED array 12 light source. In the embodiment shown the luminaire is mounted to a yoke 14 that is capable of providing motorized pan and tilt movement for the LED array 12 of the luminaire 10. The yoke in turn is mounted to a top box 16 which may contain movement processing electronics 42, motor drivers 44 and driving electronics for the LEDs 48 as well as communication systems 40 to allow it to receive data such as from an industry standard DMX512 data stream or some other similar protocol. In further embodiments, the top box 16 may also contain a media server 46 capable of outputting pixel mapped images under command of a DMX512 signal. The media server may be a module that can be easily removed or replaced. The pixel mapped images may control individual LEDs or LED pixels comprising adjacent red, green and blue LEDs in the LED array 12 so that they behave as pixels in an image display. Use of the LEDs in an LED luminaire to display images in this manner is well known in the art.

Figure 2:
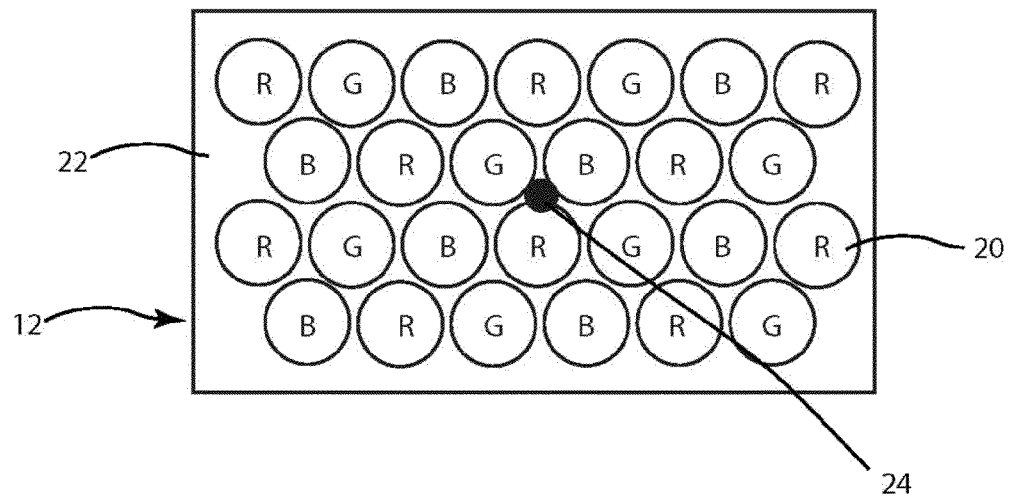
FIG. 2 illustrates an exemplar LED array of the multi-parameter automated luminaire embodiment of FIG. 1.

FIG. 2 illustrates an embodiment of an LED array 12 of the multiparameter luminaire 10 of FIG. 1 with a plurality of LEDs 20 in the LED array 12. In the embodiment shown the LEDs 20 are mounted on a substrate or circuit board 22. The LEDs 20 may be of a single color and type or may be, as shown here, of multiple colors. In the example illustrated three colors of LEDs are used; Red (R), Green (G) and Blue (B). The disclosure is not limited by the number or types of LEDs used and is applicable with any layout of any number of any type of LEDs or OLEDs.

A temperature probe 24 is also mounted on the substrate or circuit board 22. In alternative embodiments temperature probe 24 may also be mounted in other locations such as on a heat sink (not shown).

Figure 3:
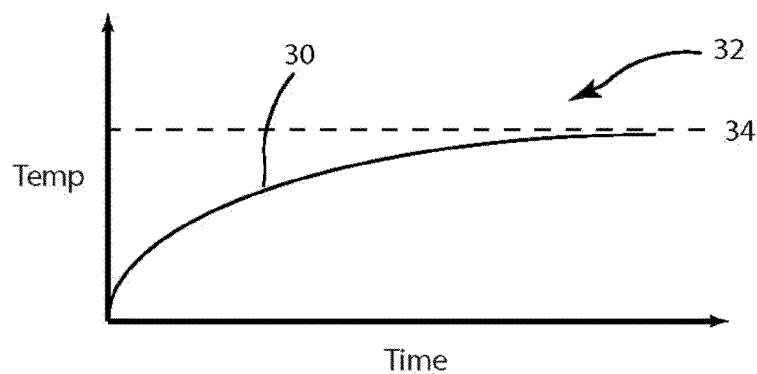
FIG. 3 illustrates an exemplar graph of temperature versus time for an LED.

FIG. 3 illustrates an exemplar curve 30 on a temperature versus time graph 32 for an LED, or LED array, run at a fixed power level. When the power is set to a normalized level the temperature will rise over time and tend towards an asymptotic limit 34.

Figure 4:
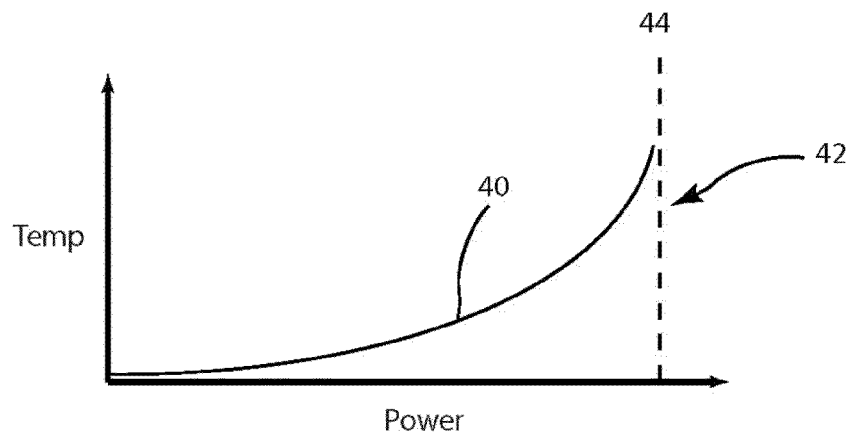
FIG. 4 illustrates an exemplar graph of temperature versus power for an LED.

FIG. 4 illustrates an exemplar curve 40 on a temperature versus power graph 42 for an LED, or LED array. In this case the temperature rises increasingly with power. As we near the point where the heat sink is incapable of dissipating the heat generated 44 the array may go into a thermal runaway situation where the temperature rises rapidly and the LEDs are permanently damaged. It is important to avoid such a result. In the embodiment illustrated a single probe is used. This probe may consist of a single sensor or it may consist of a temperature sensor with thermal connection to receive temperature signals from one or more sections or locations on the circuit board 22 and or heat sink(s). In other embodiments, the temperature probe may have several sensors located in different sections of the circuit board 22 and/or heat sink(s) (not shown). In other embodiments several individual sensors or probes may be employed to provide temperature information to the LED driver software described below.

Figure 5:
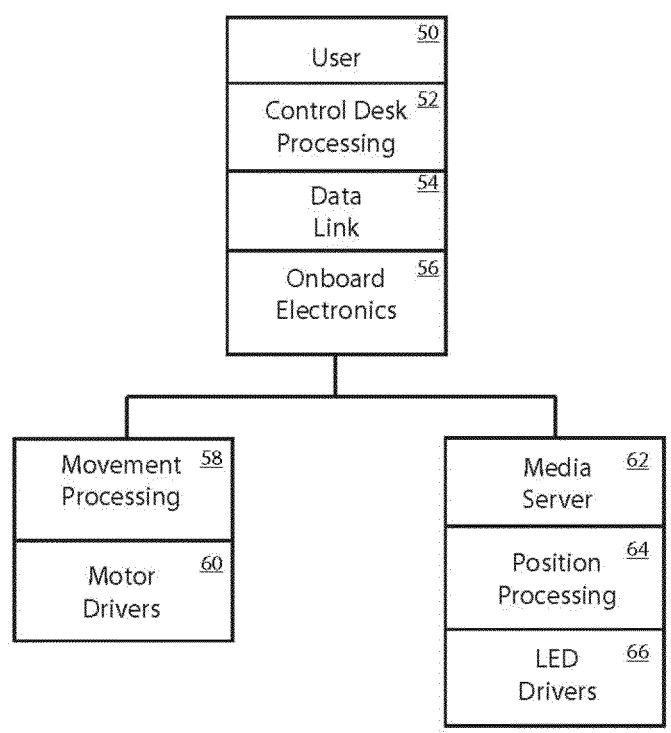
FIG. 5 illustrates an embodiment of the invention showing major software components.

FIG. 5 illustrates an embodiment of the major software components of the embodiment illustrated in FIG. 1. User input 50 to a control desk (not shown) is processed 52 on the control desk before transmitting through the data link 54 to the electronics 56 onboard the luminaire (not shown). The data stream is initially processed in the onboard electronics 56 and split into its major components. Luminaire movement data passes to the movement processing section 58 and thence to the motor drivers 60. Another major component is the image or light pattern data for the desired output of the LED array (not shown).

One of the routines performed by the LED driver hardware (48 from FIG. 1 and software drivers 66 is as follows:
a. Set the LED power to a known value;
b. Measure the temperature of the substrate or circuit board using a temperature probe;
c. Measure and establish the rate of rise curve for Temperature with Time as illustrated in FIG. 3;
d. Increase the Power a known amount and repeat (b) and (c) to establish the rate of rise curve for Temperature with Power as illustrated in FIG. 4;
e. Take as many measurements as necessary to complete this data throughout the nominal range of operations.

The curves established may be extrapolated back to allow both the prediction of final steady state die temperature from any desired input power and the time that will be taken to achieve that temperature.

Now, when it is desired to maximize the output of any particular LED or sub-group of LEDs in the luminaire for continuous operation, we may take the power needed to illuminate that sub-group of LEDs, compare that with the known data for the entire set of LEDs and the known rate of rise curves for Power and Temperature of those LEDs as well as the current temperature returned by the temperature probe and derive a total power possible for the sub-group. For example, if the total power capacity for the entire luminaire is 300 W when all R, G and B LEDs are illuminated and the user wishes to only illuminate the R and G LEDs. Assuming all three groups are equal in nominal consumption and efficiency then the simple solution when running two groups out of three would be to supply ⅔ of the full capacity power or 200 W.

However by taking note of the temperature rise and the relationship between Power and Temperature for the luminaire as seen in FIG. 3 we may increase the power to, for example, 250 W and still maintain acceptable temperatures on all LEDs.

In a further embodiment we may increase the power supplied to an LED when the use is intermittent, such as when being used as a strobe. In this case we can use our knowledge of the temperature/time relationship as shown in FIG. 3 as well as the temperature/power relationship as shown in FIG. 4 to apply power at much increased levels when the LED is on in the knowledge that the LED will then be off for a period of time thus allowing heat to dissipate.

In a further embodiment we apply compensation to the temperature reported by temperature probe to compensate for any thermal lag that might be present between the LED die and the position of thermal probe. In one embodiment this compensation takes the form of increasing the value of the measured temperature. In a preferred embodiment this compensation increases the value of the measured temperature as a function of the rate of change of temperature based on the known values that the LEDs in the array are being driven.

In a further embodiment a fan (not shown) may be used to assist with cooling the LEDs. In some entertainment venues such as theatres or opera houses it is important to minimize the noise produced by luminaires and running any fans at as low a speed as possible can assist with this need. The speed of the fan may be controlled to provide the right amount of cooling while keeping the fan speed as low as possible so as to minimize noise produced by the luminaire. The luminaire may optimally control the fan speed to minimize noise using knowledge of (i) the temperature reported by temperature probe 24, (ii) the power and thus heat load required by the LEDs and, (iii) the current ambient temperature.

In a single LED array the routine may be used to control the entire array in unison so that the adjustment of the control signals to the LEDs is consistent. In alternative embodiments it may be used only to control a subset of the array, particularly when multiple temperature sensors or temperature probes are used. In the later case, if the fixture is being used to provide light, it might be desirable to maximize light output from each subsection. If the fixture is being used to project an image it might be desirable to maximize the consistence of adjustment across the entire LED array.

Figure 6:
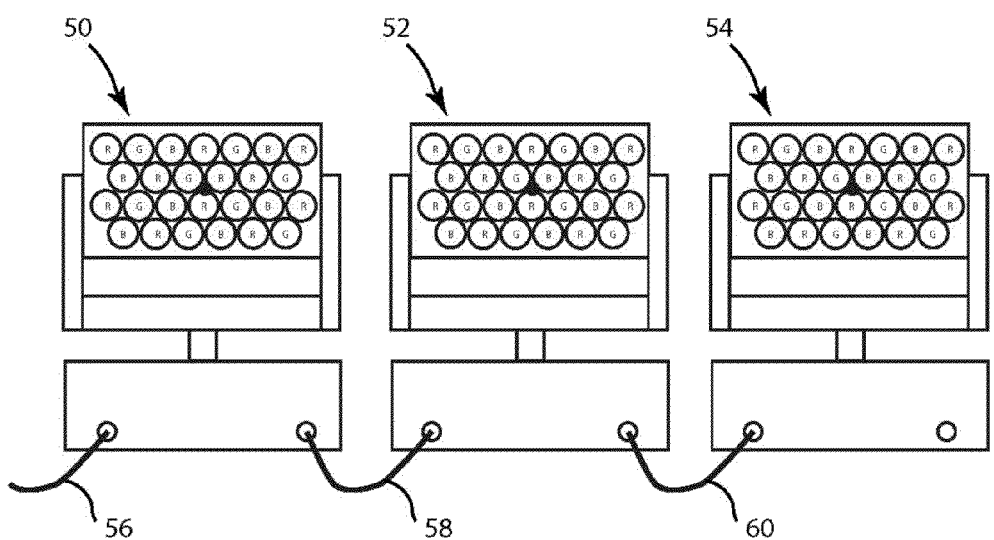
FIG. 6 illustrates an array of automated luminaires each with an array of LEDs where the luminaires are configured in a linear arrangement.

FIG. 6 illustrates another embodiment of the invention. In this embodiment, a series of yoke mounted automated LED luminaires 50, 52, and 54 connected together through a serial daisy chain signal and cable 56, 58, and 60. In the embodiment employing DMX512, input cable 56 carries the DMX512 signal from a control desk to first luminaire 50 and thence in a daisy chain manner through cable 58 to luminaire 52 and cable 60 to luminaire 54. Each automated LED luminaire 50, 52, and 54 may be addressed such that it responds to data on the DMX512 signal that is specific to said luminaire. Each LED luminaire 50, 52, and 54 may contain a media server capable of outputting pixel mapped images under command of a DMX512 signal that control the LEDs in its associated LED array. Through the common DMX512 signal such a series of luminaires may behave in a coordinated manner. For example, the luminaires may share there temperature information with each other and the control desk so that if desired, the luminaires may coordinate so that the drivers drive the LEDs so that the correction to color and intensity as a result of the above described routine of the LED drivers is uniform across the array of LED luminairs rather than just for individual LEDs, or individual LED arrays or sub-arrays. Such coordination may also be employed so that a single image may appear across all the LED arrays, portion 1 on luminaire 50, portion 2 on luminaire 52 and portion 3 on luminaire 54 as is described in greater detail below. When an array of LED luminairs is employed to project a single image, it might be desirable to have the light color and output adjustments be uniform from fixture to fixture. If the array of luminaries is being used to provide light rather than display an image it may be desirable that the total output from each array be consistent across the array of luminaries.

The image displayed may be a stationary image or a stream of images representing a moving video based image provided by the local store within each LED luminaire 10.

Figure 7:
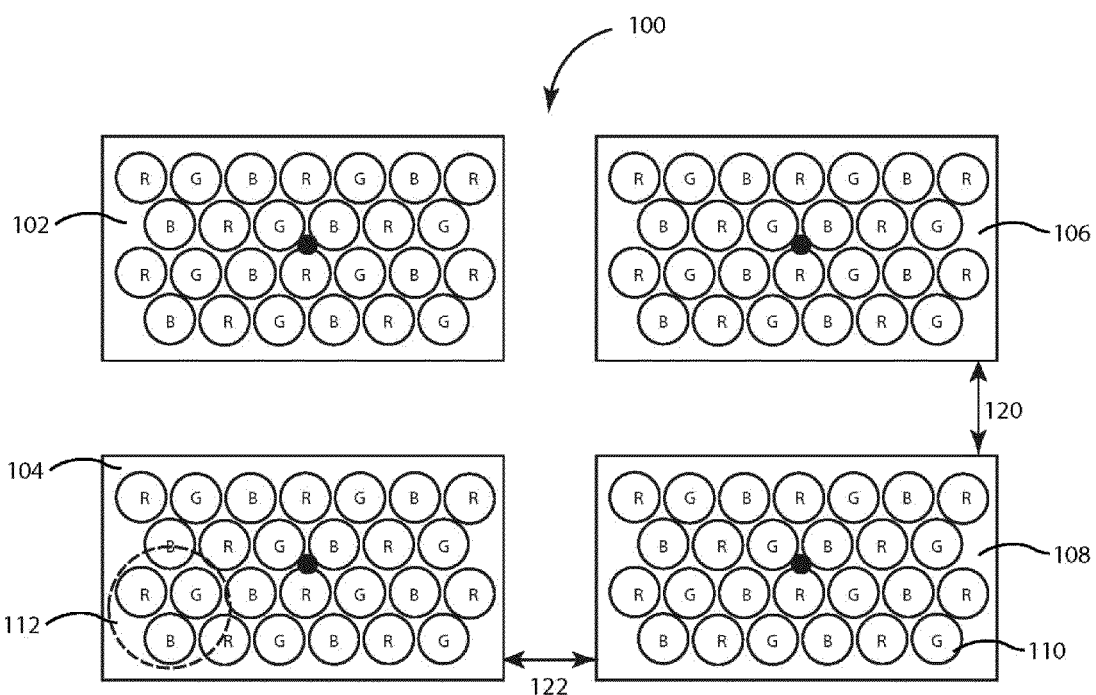
FIG. 7 illustrates an of automated luminaries in a two-dimensional array configuration where each luminaire includes an LED array in order to display an image(s) or light pattern.

FIG. 7 FIG. 8, FIG. 9 and FIG. 10 all illustrate exemplar variation embodiments of arrays of LED array luminaires. FIG. 7 is a small four luminaire 102, 104, 106, 108 array 100 where the luminaires are evenly vertically spaced 120 and evenly horizontally spaced 122. From the spacing information, the size of the array, and the size of the image(s) to be projected the media server (not shown) either in one or more luminaires or in a central control desk determines which portions of the image(s) to assign to each luminire. In this embodiment the luminaire arrays include RGB color groupings 112 of individual LED sources 110. The media server, wherever it is located, also has access to information about the size and distribution of the LED/LED group arrays in each luminaire for mapping images or portion of images to the luminaire's LED array.

Figure 8:
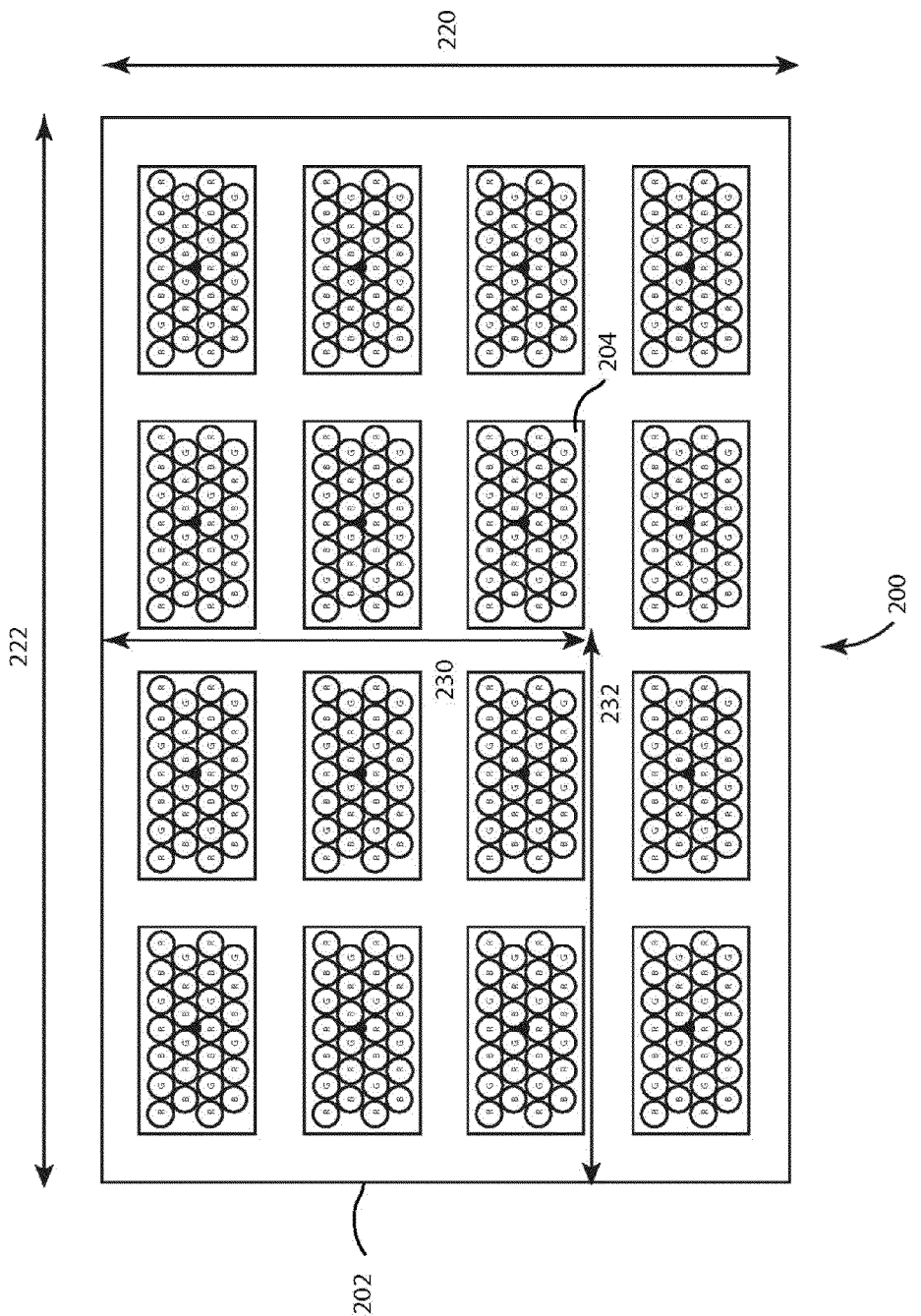
FIG. 8 illustrates another embodiment of an array of automated LED array luminaires configured in a two-dimensional array.

FIG. 8 and illustrates a larger array 200 of evenly spaced LED array luminaires 204. Box 202 illustrates and image size vertically 220 and horizontally 222 bounded into which the individual luminaires 204 are evenly spaced and the position of each luminaire vertically 230 and horizontally 232 are known. From this information and the size of the image(s) to be displayed, the media server (not shown) either in one or more luminaires or in a central control desk can determine which portions of an image to assign to each luminire.

Figure 9:
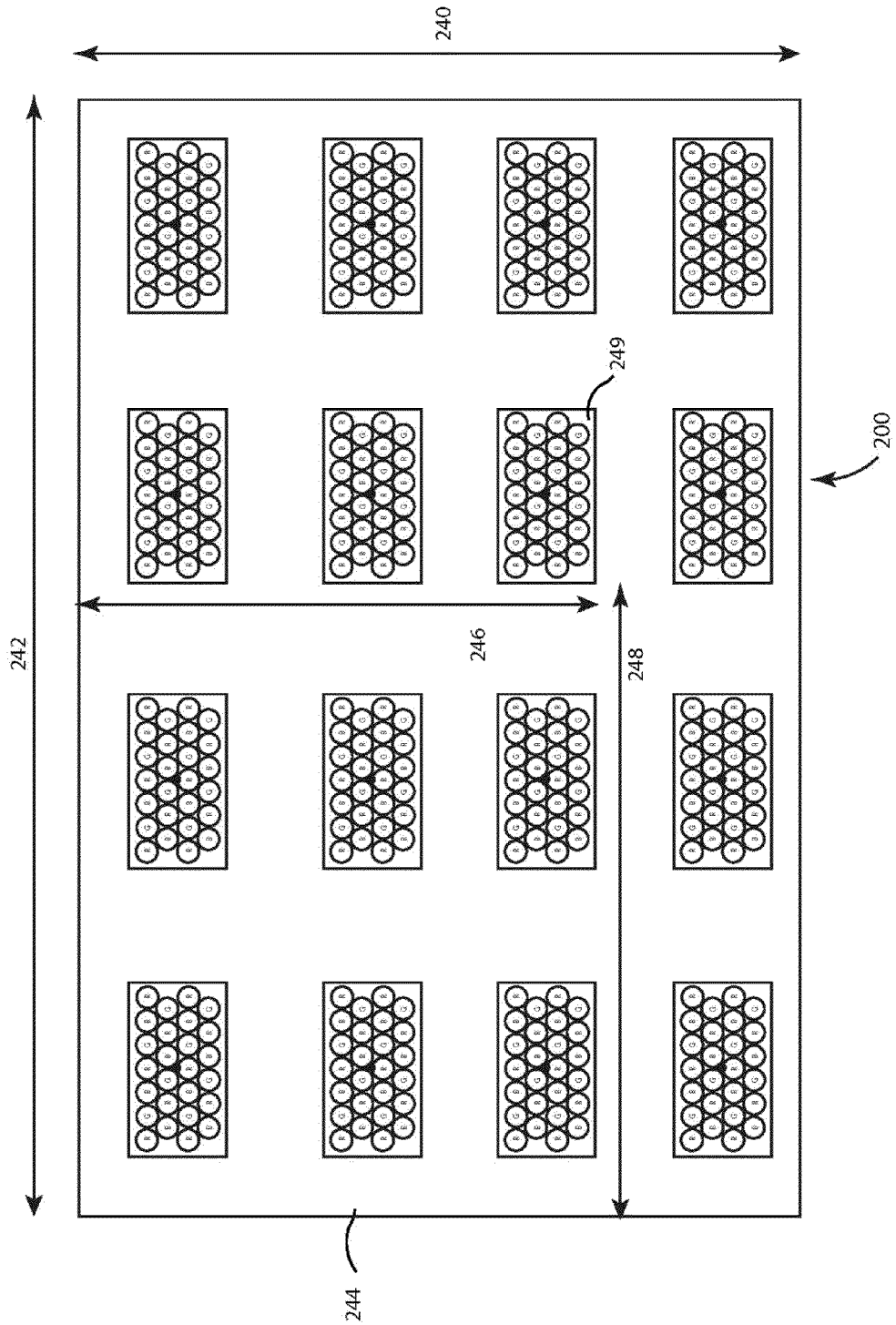
FIG. 9 illustrates an other embodiment of the luminaire array of FIG. 7 wherein the spacing between the luminaries has been increased.

FIG. 9 illustrates the same array 200 but disbursed over a larger bounded image 244 vertical 240 and horizontal 242 size with different luminaire 249 positions vertically 246 and horizontally 248. From this information and the size of the image(s) to be displayed, the media server (not shown) either in one or more luminaires or in a central control desk can determine which portions of an image to assign to each luminire.

Figure 10:
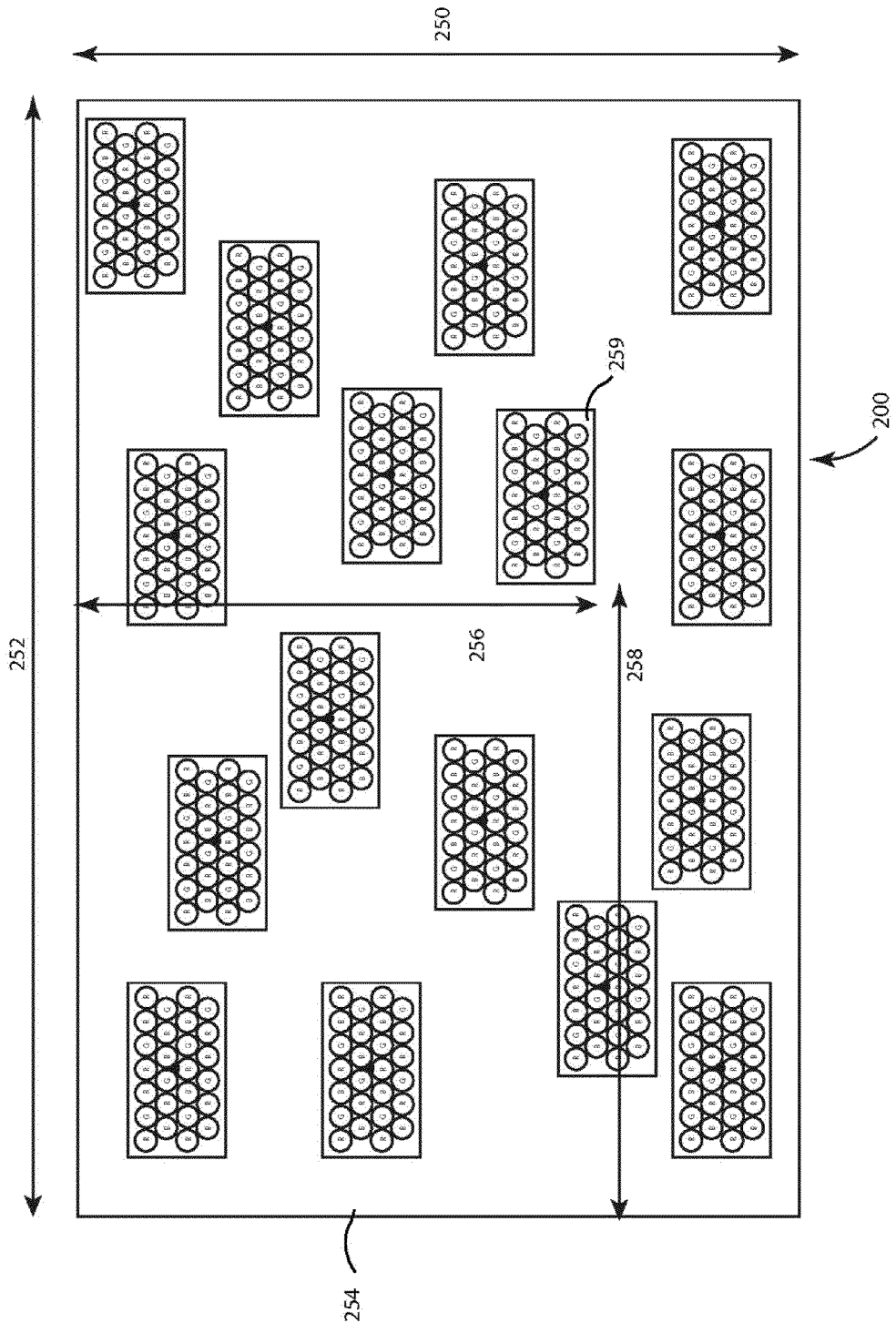
FIG. 10 illustrates another embodiment of the luminaire array of FIG. 7 wherein the spacing between the luminaries is not uniform or consistent.

FIG. 10 illustrates a random array 200 but disbursed over a bounded image 254 vertical 250 and horizontal 252 size with different luminaire 259 positions vertically 256 and horizontally 258. From this information and the size of the image(s) to be displayed, the media server (not shown) either in one or more luminaires or in a central control desk can determine which portions of an image to assign to each luminire.

Figure 11:
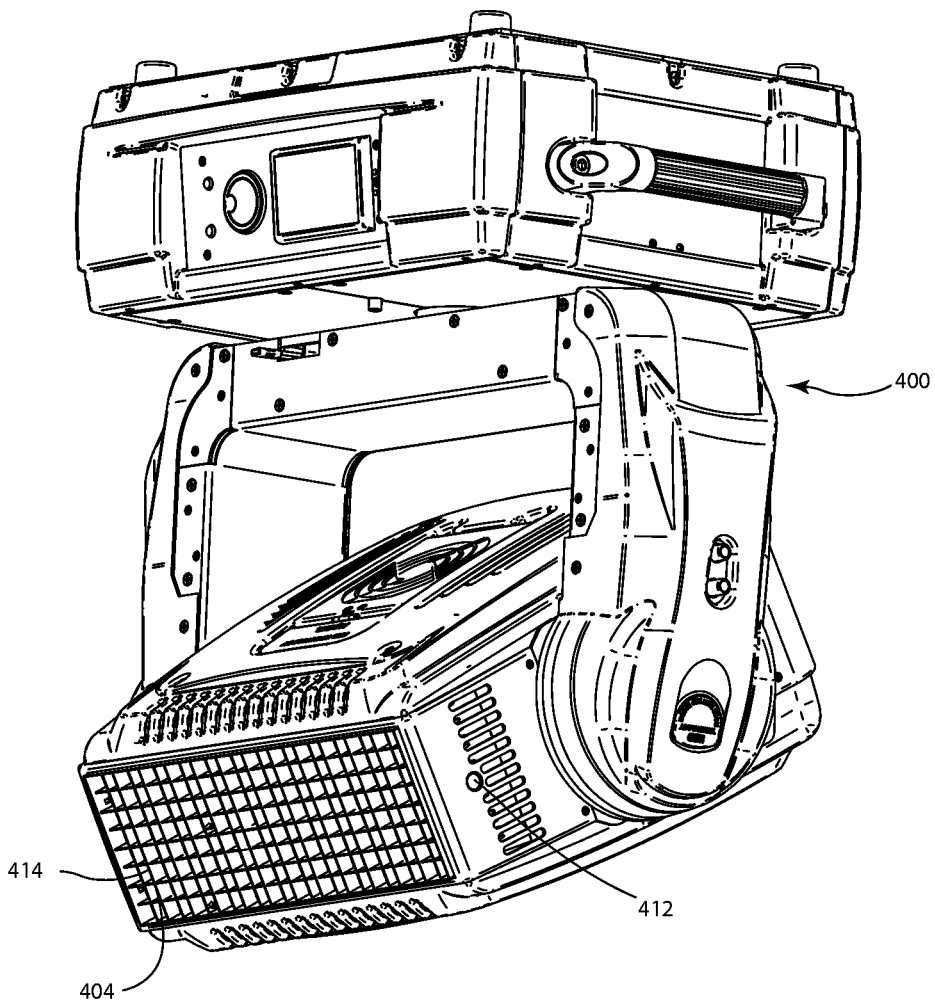
FIG. 11 illustrates an alternative embodiment of the invention with a beam control system mounted proximate to the LED array.

FIG. 11 illustrates an embodiment of the invention: an automated luminaire 400 with an array of LEDs fitted with a beam control array 414 may be mounted to the front of the luminaire adjacent to the LEDs 404. Beam control array 414 is retained on the luminaire 400 by retention clip 412. Retention clip 412 may be recessed such that the unit is secure against accidental removal of the beam control array 414. In an alternative embodiment the beam control array 414 may be a fixed feature of the luminaire. However in the preferred embodiment it is removable so that it can be cleaned or replaced or substituted with a differently shaped array the benefits of which will be appreciated below.

Figure 12:
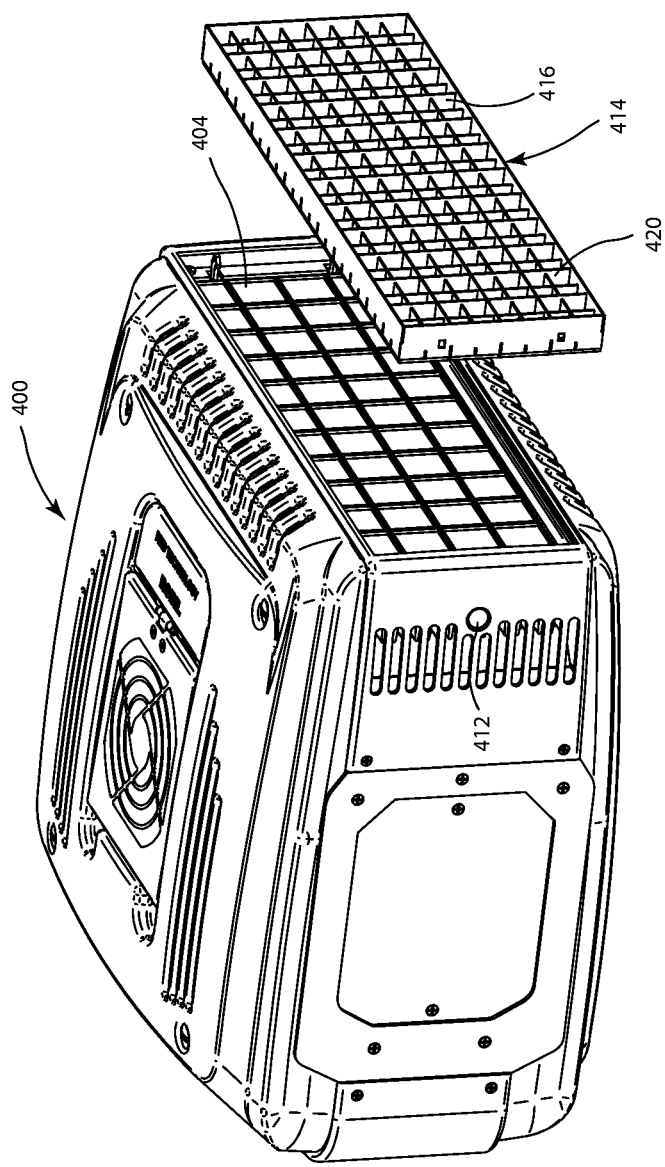
FIG. 12 illustrates a view of the beam control system of FIG. 11 with the beam control system detached from the LED array.

FIG. 12 illustrates an exploded view of the embodiment illustrated in FIG. 11. Luminaire 400 contains an array of LEDs 304. A beam control array 414 may be mounted to the front of the luminaire adjacent to the LEDs 404. Beam control array 414 is retained on the luminaire 400 by retention clip 412. And may be easily installed and removed as a single item.

Figure 13:
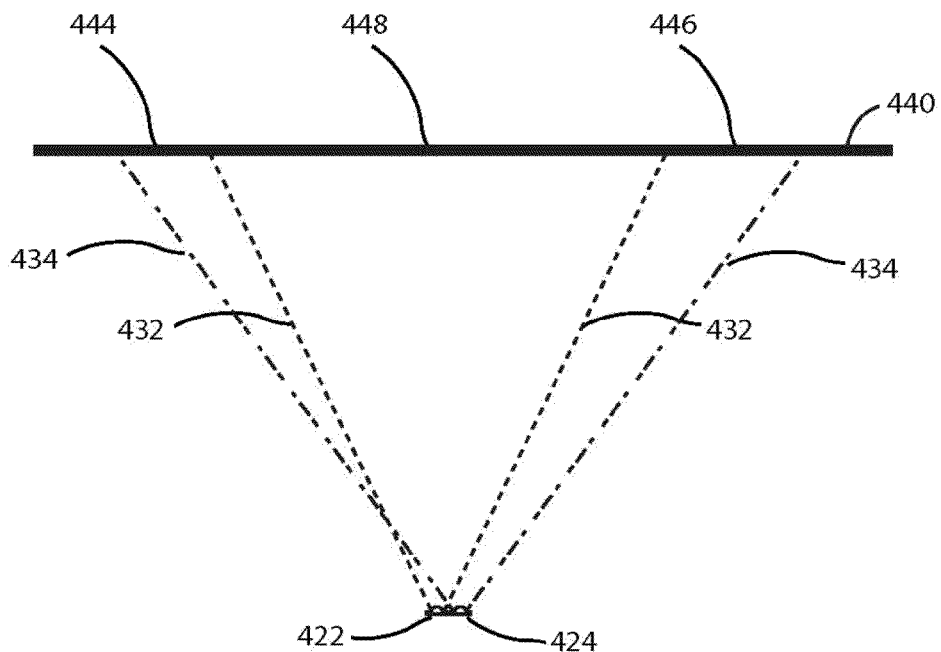
FIG. 13 illustrates a problem with prior art LED array lighting fixtures.

FIG. 13 illustrates a problem posed by prior art LED array luminaries. FIG. 13 illustrates two LEDs as may be used in an LED array luminaire causing light spill and or color fringing. LED 422 and LED 424 may be of differing colors and, due to the different optical properties and construction of the LED dies, produce light beams 432 and 434 respectively that differ in beam spread. The differing beam spreads mean that the light beams from LEDs 422 and 424 will impinge on an illuminated object 440 in such a way that areas 444 and 446 of the object are illuminated by a single LED only rather than the desired mix of both. This results in areas 444 and 446 being colored differently from the central mixed area and appearing as colored fringes. Two LEDs only are illustrated here for clarity and simplicity however the same problem exists with systems incorporating more than two colors of LED.

Figure 14:
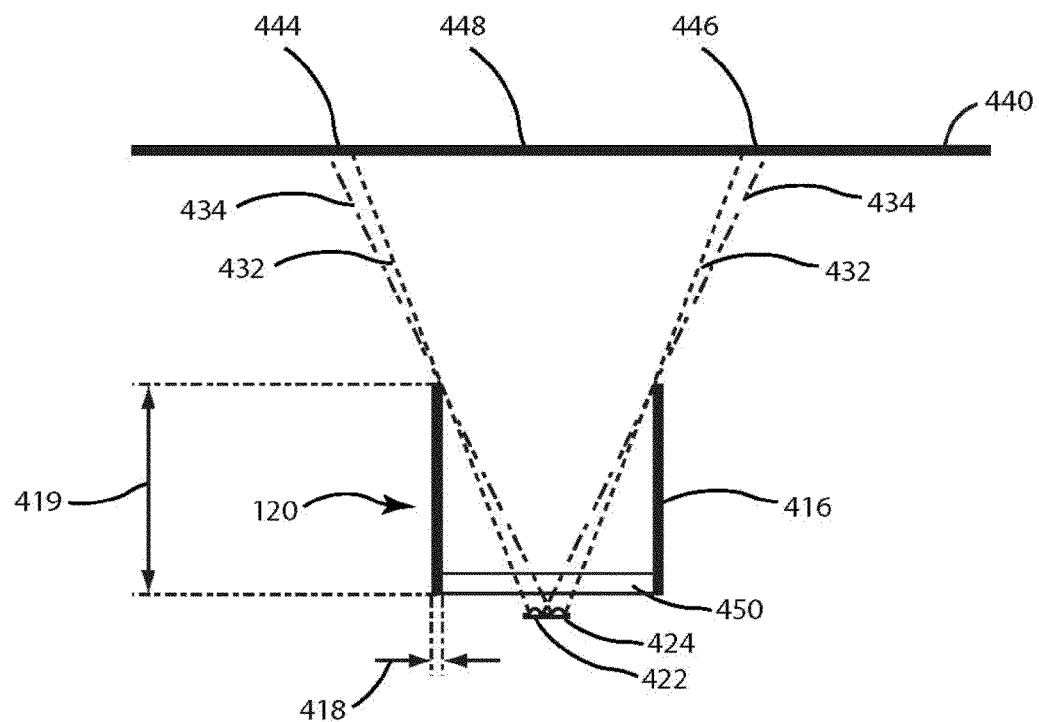
FIG. 14 illustrates a single cell of an embodiment of the beam control array of FIG. 11.

FIG. 14 illustrates a single cell of the beam control array 414. The light output from the same LEDs 442 and 424 with differing beam angles as used in the prior art system shown in FIG. 13 are impinging on object 440. However, in the disclosed device the light from LEDs 442 and 424 is modified by optical element 450 and louver mask 416 such that the beam angles from each LED are constrained to be very similar and the areas of color fringing 444 and 446 are significantly reduced in size. Optical element 450 is an optional component in the system and may be a lens, lens array, micro-lens array, holographic grating, diffractive grating, diffuser, or other optical device known in the art. It can be seen that changing the height of louver mask 416 will alter the constrained beam angle of the output beam. A taller louver 416 will produce a narrower beam and a shorter louver will produce a wider beam. The louver mask 416 may be of fixed height or may be adjustable. Louver mask 416 may preferably be non-reflective so as to avoid spill light, this may be achieved by painting or coating the louver mask with a matte black paint, anodizing or other coating as known in the art to preferably absorb or scatter rather than reflect light. LEDs 422 and 424 may be of a single color and type or may be, as shown here, of multiple colors. In the example illustrated two colors of LEDs are used. The invention is not limited by the number, colors, or types of LEDs used and is applicable with any layout of any number of any type and any color of LEDs or OLEDs. FIG. 14 shows both LEDs 422 and 424 within the same louver mask 416 however other embodiments may utilize separate louver masks for each LED. In alternative embodiments rather than increasing the height 419 of the louvers 416 the width 418 of the louver(s) may be increased for a similar result.

Figure 15:
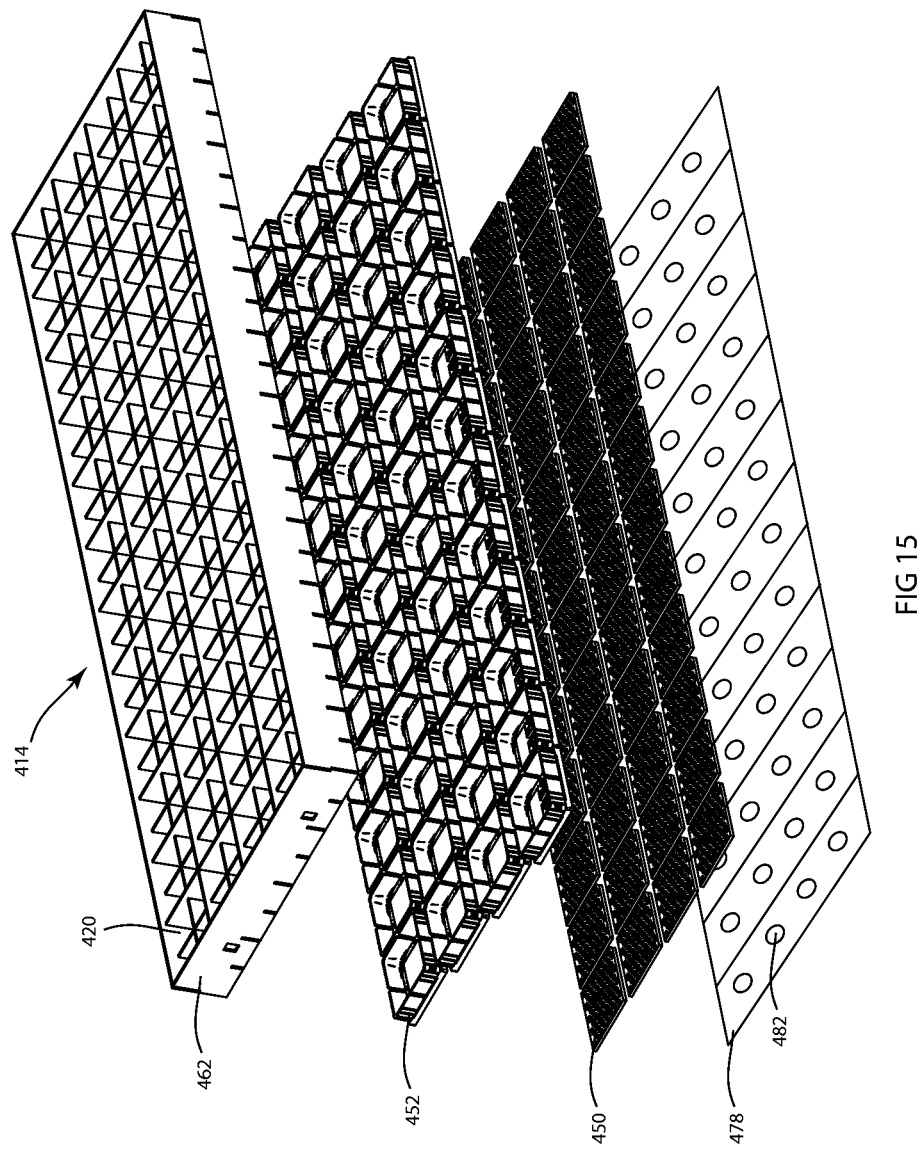
FIG. 15 illustrates an exploded diagram view of the beam control array embodiment of FIG. 14.

FIG. 15 illustrates an exploded diagram of an embodiment of the beam control array 414. Beam control array 414 comprises a louver mask array 462 containing multiple cells 420. Mounted onto the louver mask array 462 are optical element carriers 452 which clip into the cells 420 of the louver array 462. Each optical element carrier 452 may in turn contain an optical element 450. Optical elements 450 are here illustrated as micro lens arrays; however, the invention is not so limited and optical elements 450 may be any optical beam control device as known in the art. Each optical element 450 is clipped into an associated optical element carrier 452.

In one embodiment of the beam control array, every optical element 450 is identical but in further embodiments the optical elements 450 may differ across the beam control array 414. For example, alternating optical elements 450 may be of two different beam angles. In a yet further embodiment, the optical elements 450 around the periphery of the beam control array 414 may be of one beam angle that differs from the beam angle of the optical elements 450 in the center of the beam control array 414. In yet further embodiments, the height of louver mask array 462 may be varied to effect different controlled beam angles for the emitted light. Such combinations of differing optical elements and louver array height may be advantageously chosen so as to allow fine control of the beam shape and quality. Notwithstanding the above and the various combinations of optical elements the entire beam control array 414 may be installed or removed from the luminaire as a single easily replaced item. When installed on the luminaire the beam control array is adjacent to the LEDs 482 mounted on the LED Circuit board 478, reduces color fringing or halation and controls the beam angle to provide the lighting designer with a well controlled and defined beam of a single homogeneous color.

In one embodiment optical elements and louver arrays are provides such that symmetrical beams with angles of 12°, 25°, and 45° are available. In further embodiments an asymmetrical optical element may be used that provides an elliptical beam such as one that is 15° in one direction and 45° in an orthogonal direction. The beam angles given here are examples only and the invention is not so limited. Any beam angle or combination of beam angles is possible within a beam control array without departing from the spirit of the invention.

Beam control array 414 may further provide mechanical protection and dust exclusion for the LEDs 404. To allow for such protection without the optical element affecting the beam angle an optical element comprising a clear, flat window may be used. Such a window has no effect on the beam while still providing protection and dust exclusion.

The control array 414 may also be of different shaped cells than those shown. For example the cells be me round or hexagonal or other regular or non-regular shapes.

The user or rental company may stock a range of different beam control arrays with differing optical elements and louver array heights to facilitate quick and easy customization of a luminaire to provide the beam angle required for the current event or show.

Figure 16:
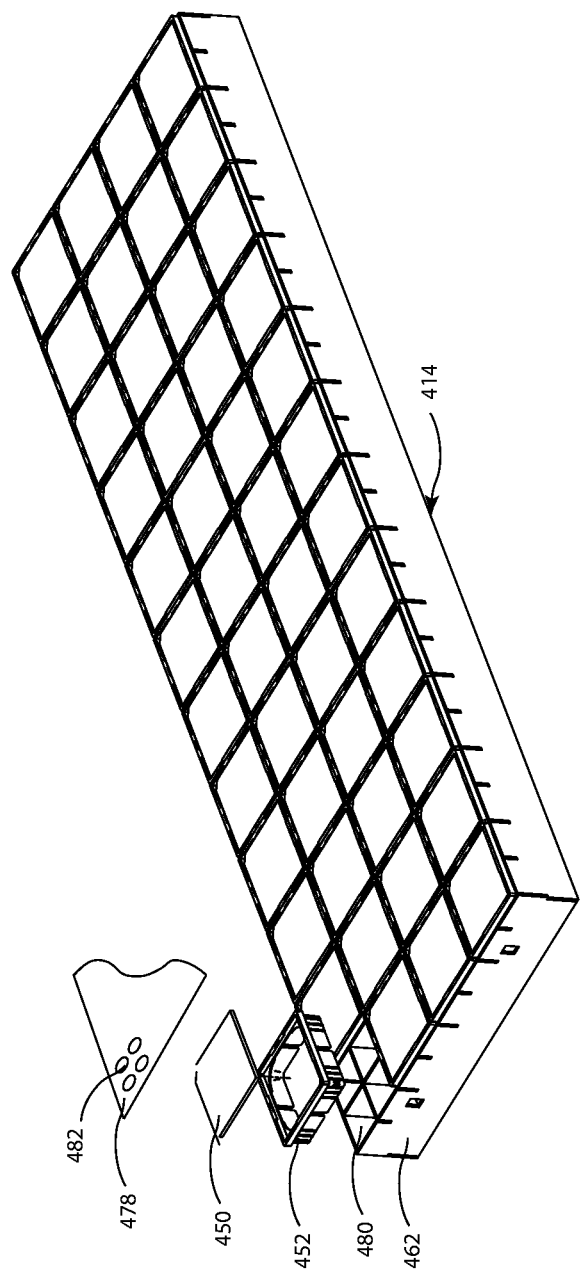
FIG. 16 illustrates an exploded diagram view of the embodiment of the beam control array embodiment of FIG. 14.

FIG. 16 illustrates an assembled array of an embodiment of a beam control array 414. FIG. 16 is viewed from the reverse direction of FIG. 15 and shows an assembled beam control array 414. Louver mask array 462 cells 420 may contain multiple sub-compartments 480 each of which may control the light output for a single LED die. Optical element carrier 452 clips into the louver mask array 462 and, in turn, contains optical element 450. Optical element 450 is adjacent to the LED dies 482 mounted on LED support 478. Each LED 482 may comprise a single LED die of a single color or a group of LED dies of the same or differing colors. For example in one embodiment LED 482 comprises one each of a Red, Green, Blue and Amber die. In such systems each LED die may be independently aligned with a sub-compartment 480 of the louver mask cell 420.

While the disclosure has been described with respect to a limited number of embodiments, those skilled in the art, having benefit of this disclosure, will appreciate that other embodiments may be devised which do not depart from the scope of the disclosure as disclosed herein. The disclosure has been described in detail, it should be understood that various changes, substitutions and alterations can be made hereto without departing from the spirit and scope of the disclosure.

What is claimed is:

1. A luminaire comprising:
an array of LED groups;
a louver mask comprised of a plurality of louver cells;
where the cells are arrayed such that LED groups are paired with louver cells of the louver mask,
where the individual cell(s) of the louver mask have depth which constrains the beam angles from the LED group with which it is paired,
the depth of the cell(s) of the louver mask is adjustable.

2. A luminaire of claim 1 wherein:
a plurality of the individual LED group(s) each contain a single LED.

3. A luminaire of claim 1 wherein:
a plurality of the individual LED group(s) each contain a plurality of differently colored LEDs.

4. A luminaire of claim 1 wherein:
the louver mask cell(s) have non-reflective surfaces.

5. A luminaire of claim 1 wherein:
said depth adjustment provides shorter depth cell(s) which provide a wider beam angle.

6. A luminaire of claim 1 wherein:
said depth adjustment provides longer depth cell(s) provides a narrower beam angle.

7. A luminaire of claim 1 wherein:
the individual cell(s) of the louver mask have width which constrains the beam angles from the LED group with which it is paired wherein the width of the cell(s) of the louver mask is adjustable.

8. A luminaire of claim 7 wherein:
said width adjustment provides wider width cell(s) which provides a wider beam angle.

9. A luminaire of claim 7 wherein:
said width adjustment provides smaller width cell(s) which provides a narrower beam angle.

10. A luminaire of claim 1 wherein:
the louver mask is removable from the luminaire.

11. A luminaire of claim 10 wherein:
the louver mask cell(s) have non-reflective surfaces.

12. A luminaire of claim 1 wherein:
the louver masks cells are rectangular.

13. A luminaire of claim 1 wherein:
the louver masks cells are hexagonal.

14. A luminaire of claim 1 wherein:
the louver masks cells are round.

15. A beam control array for a LED array luminaire comprising:
a plurality of cells such that individual LED groups are paired with a cell,
beam control cell(s) further contain an optical element(s) such that light from the LED group passes through the optical element
wherein the beam control array is removable from the LED array luminaire.

16. A beam control array of claim 15 wherein:
a plurality of the individual LED group(s) each contain a single LED.

17. A beam control array of claim 15 wherein:
a plurality of the individual LED group(s) each contain a plurality of differently colored LEDs.

18. A beam control array of claim 15 wherein:
the optical elements are lenses.

19. A beam control array of claim 15 wherein:
the optical elements are lens arrays, micro-lens arrays, holographic gratings, diffractive gratings, or diffusers.

20. A beam control array of claim 15 wherein:
the optical elements in the array are identical.

21. A beam control array of claim 15 wherein:
the optical elements in the array differ.

22. A beam control array of claim 15 wherein:
the beam angle from each of the optical elements symmetrical.

23. A beam control array of claim 15 wherein:
the beam angle from each of the optical elements is asymmetrical.

24. A beam control array of claim 15 wherein:
the optical elements protects the LED group with which it is paired.

25. A beam control array of claim 15 wherein:
the optical elements in the array are individually removable from the cells.

26. A beam control array for a LED array luminaire comprising:
a plurality of cells such that individual LED groups are paired with a cell;
beam control cell(s) further contain an optical element(s) such that light from the LED group passes through the optical element,
wherein the optical elements in the array are individually removable from the cells.

27. A luminaire comprising:
an array of LED groups; and
a louver mask comprised of a plurality of louver cells where the cells are arrayed such that LED groups are paired with louver cells of the louver mask;
the individual cell(s) of the louver mask have depth and width which constrains the beam angles from the LED group with which it is paired; and
wherein the width of the cell(s) of the louver mask is adjustable.

28. A luminaire of claim 1 wherein:
a plurality of the individual LED group(s) each contain a single LED.

29. A luminaire of claim 1 wherein:
a plurality of the individual LED group(s) each contain a plurality of differently colored LEDs.

30. A luminaire of claim 4 wherein:
said width adjustment provides wider width cell(s) which provide a wider beam angle.

31. A luminaire of claim 4 wherein:
said width adjustment provides smaller width cell(s) which provide a narrower beam angle.

32. A luminaire of claim 27 wherein:
the louver mask cell(s) have non-reflective surfaces.

33. A luminaire of claim 27 wherein:
the louver mask is removable from the luminaire.

* * * * *